Nov. 27, 1928.　　　　　　　　　　　　　　1,692,844
E. W. KNOWLTON
MEAT CUTTING MACHINE
Filed Sept. 14, 1925　　　　3 Sheets-Sheet 1

Inventor,
Eugene W. Knowlton,
by Geyer & Geyer
Attorneys.

Nov. 27, 1928.
E. W. KNOWLTON
MEAT CUTTING MACHINE
Filed Sept. 14, 1925
1,692,844
3 Sheets-Sheet 2
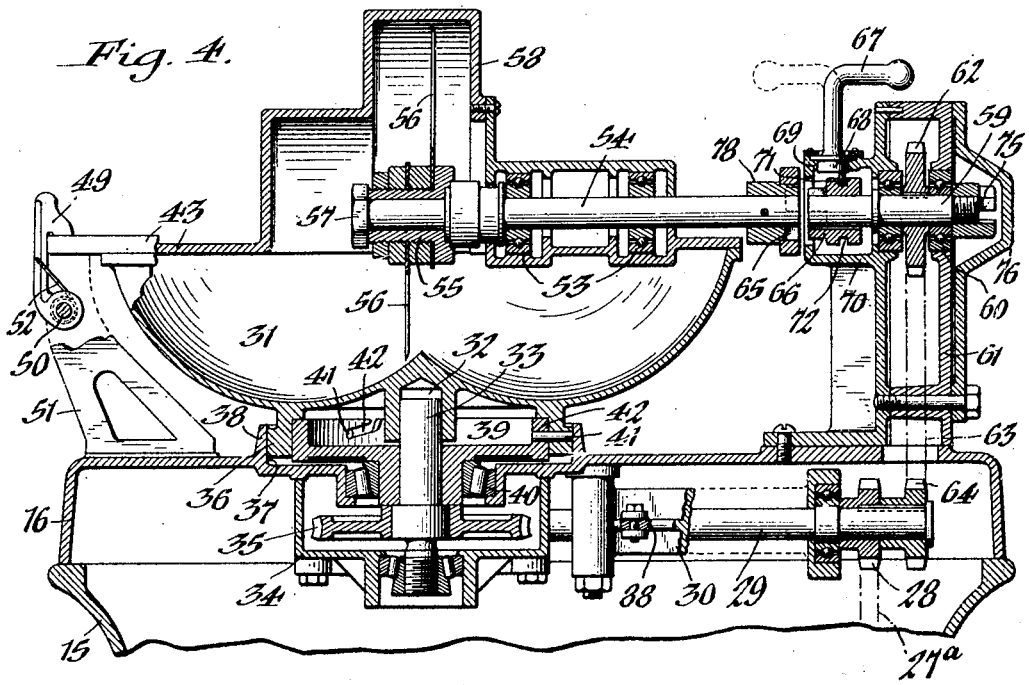

Nov. 27, 1928.  1,692,844
E. W. KNOWLTON
MEAT CUTTING MACHINE
Filed Sept. 14, 1925  3 Sheets-Sheet 3
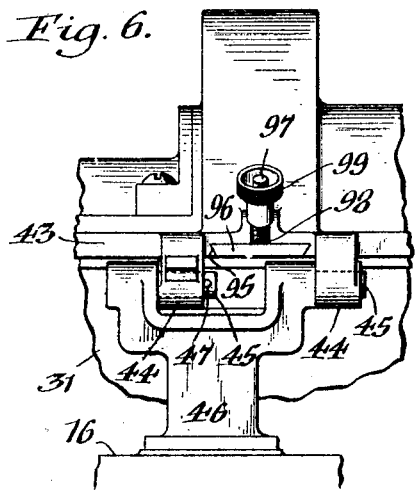
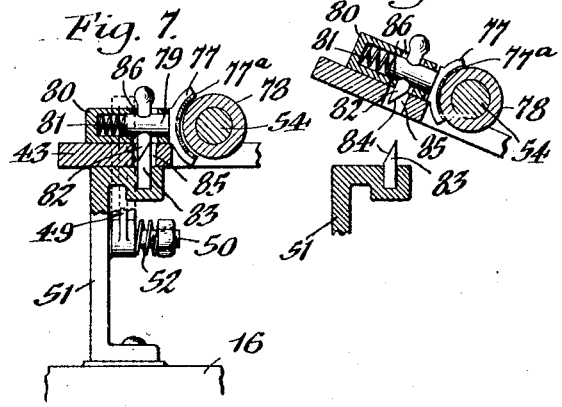
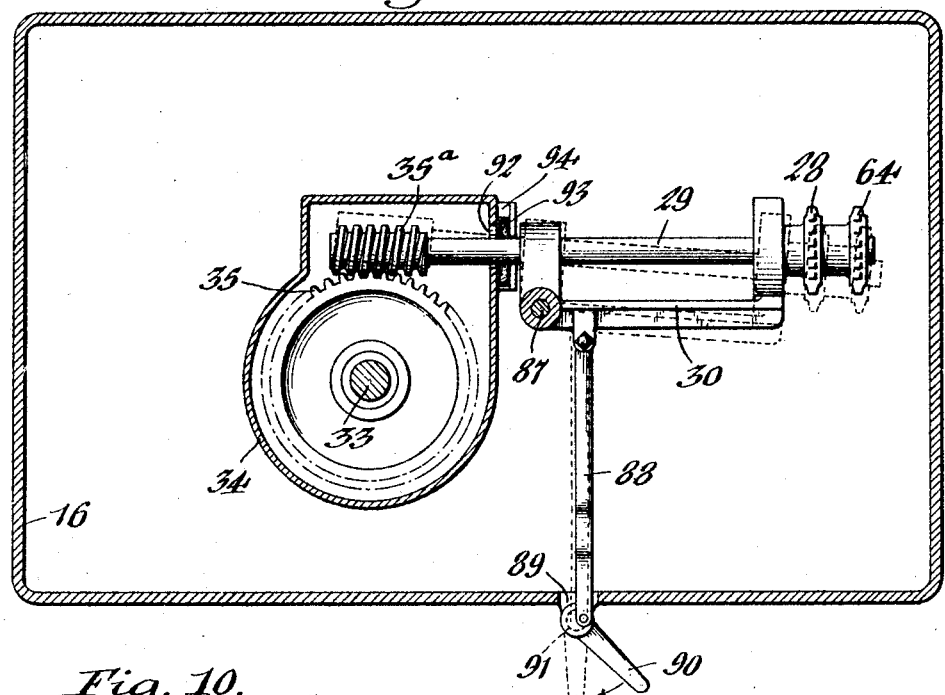
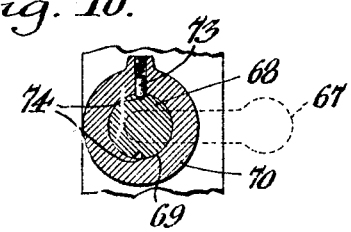

Patented Nov. 27, 1928.

1,692,844

UNITED STATES PATENT OFFICE.

EUGENE W. KNOWLTON, OF BUFFALO, NEW YORK, ASSIGNOR TO JOHN E. SMITH'S SONS CO., OF BUFFALO, NEW YORK, A CORPORATION OF NEW YORK.

MEAT-CUTTING MACHINE.

Application filed September 14, 1925. Serial No. 56,141.

This invention relates more particularly to a machine of the type employed by packers for cutting sausage meat, but which may also be used for cuttting vegetables and similar products.

One of its objects is to so construct and arrange the cutter mechanism that it can be tilted or completely removed from its normal operative position over the meat-bowl to facilitate the removal of its contents.

Another object of the invention is to provide the machine with a clutch-controlled cutter mechanism having an automatic brake for preventing rotation of the cutters when said mechanism is tilted or elevated to an abnormal position.

A further object is the provision of an efficient machine of this character having a detachable and rotatable meat-bowl or container and simple and reliable means for effecting the simultaneous or independent rotation of the bowl and the cutter mechanism.

A still further object of the invention is to provide a simple and reliable meat cutting machine which is compact in construction so as to require but a minimum of floor-space, and whose parts are so constructed and arranged as to be accessible for cleaning and repairing.

Figure 1:
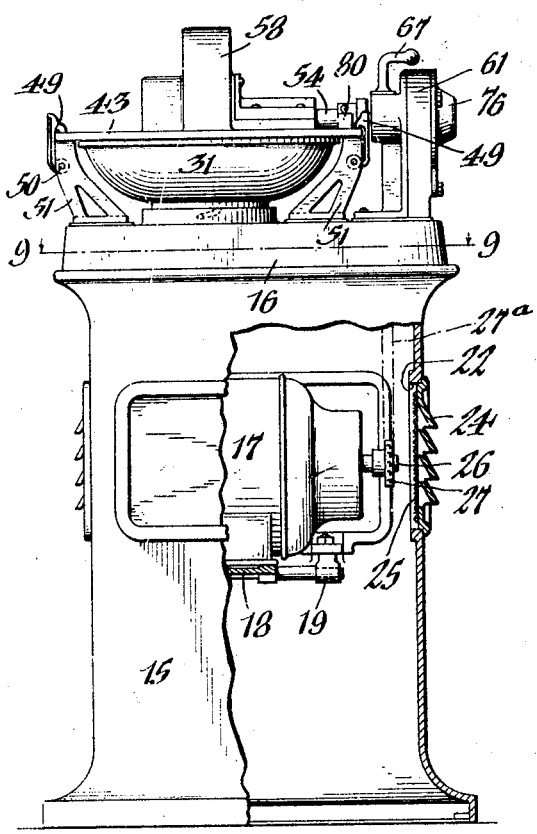
Figure 2:
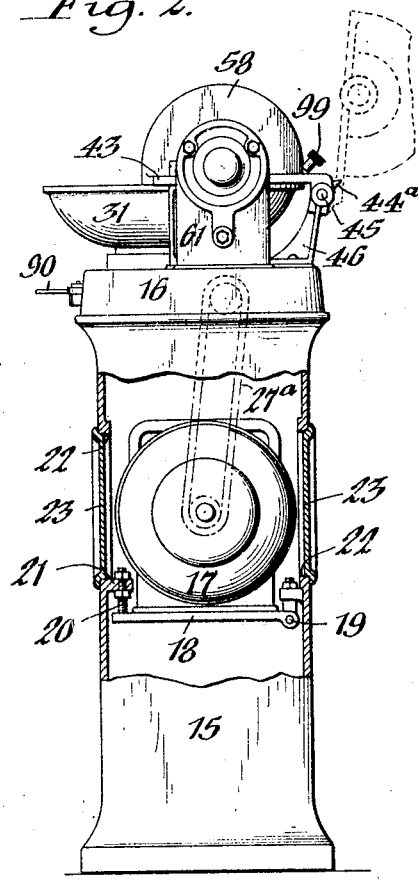
Figure 3:
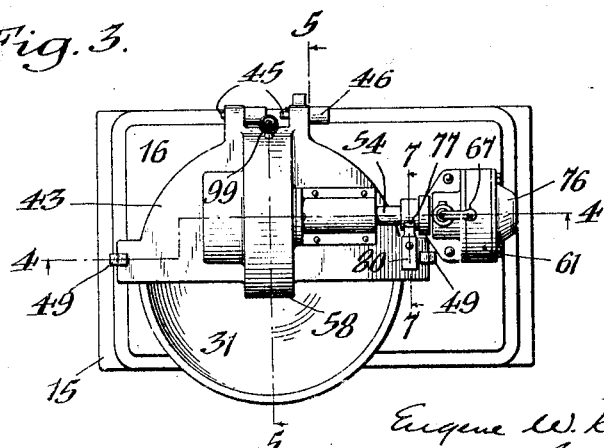

In the accompanying drawings: Figure 1 is a front view, partly in section, of a meat cutting machine embodying my improvements. Figure 2 is a side view thereof, partly in section. Figure 3 is a top plan view of the same. Figure 4 is an enlarged fragmentary transverse section on line 4—4, Fig. 3. Figure 5 is an enlarged fragmentary transverse section on line 5—5, Fig. 3. Figure 6 is an enlarged fragmentary rear view of the machine showing the manner of hinging the cutter supporting mechanism. Figs. 7 and 8 are enlarged transverse sections taken in the plane of line 7—7, Fig. 3 and showing the automatic brake of the cutter mechanism in its released and applied positions, respectively. Figure 9 is an enlarged horizontal section on line 9—9, Fig. 1. Figure 10 is a horizontal, sectional view of the means for holding the clutch control handle in its different positions.

Similar characters of reference indicate corresponding parts throughout the several views.

The various working parts of the machine are mounted on a suitable support preferably consisting of a substantially rectangular, hollow standard or pedestal 15 provided at its top with a head plate or cover 16. Contained within the pedestal for driving the rotary parts of the machine is an electric motor 17 which is attached to a vertically-swinging base plate 18 hinged at 19 to the rear wall of said pedestal and connected at its other end to an adjusting screw or bolt 20 engaging a lug 21 on the front wall of the pedestal, as shown in Fig. 2. In its front and rear walls the pedestal has openings 22 normally closed by suitable covers 23 while the end walls thereof have similar openings closed by ventilated cover-plates 24 having screens 25 applied thereto for excluding dust and other foreign matter from the interior of said pedestal. The motor-shaft 26 has a sprocket wheel 27 thereon which is connected by a sprocket chain 27ᵃ with a similar wheel 28 fixed on the outer end of a horizontal driving shaft 29 journaled in a bearing-bracket 30 housed within the head plate 16.

Surmounting the head plate is a rotatable meat-bowl or container 31 which is of the usual concavo-convex form and provided centrally of its bottom with a downwardly-opening socket 32 removably fitted over the upper end of an upright pivot-pin or shaft 33 journaled in a gear case 34 secured to the underside of said head plate. Keyed or otherwise fixed on this shaft is a worm wheel 35 which meshes with a worm 35ᵃ mounted on the driving shaft 29, as shown in Fig. 9. Depending from the bowl 31 and concentric with its socket 32 is a bearing flange or collar 36 seated in an upwardly-opening recess 37 formed by an annular flange 38 rising from the head plate. The meat bowl is adapted to be driven from the shaft 33 and for this purpose its flange 36 is detachably connected to a revolvable head or member 39 fixed on said shaft and journaled in a roller bearing 40, the connecting means preferably consisting of a plurality of radial coupling pins 41 projecting inwardly from the bowl-flange and engaging corresponding slots 42 in the rim of said revolvable head. As seen in Figs. 1 and 4, these slots are disposed at a slight angle to the horizontal to firmly lock the bowl down on to the head and prevent its vertical displacement. By mounting the bowl in this manner, it not only runs true and smooth but it can be readily removed from the revolvable head for cleaning or other purposes by giving it a fraction of a turn relative thereto to disengage its coupling pins from their slots.

The numeral 43 indicates a removable cover-plate arranged over the rear portion of the meat-bowl 31 and capable of swinging to a substantially upright position to effect the removal of the bowl when desired. For this purpose, the rear end of said cover-plate has a pair of depending ears 44 which are journaled on horizontal hinge-pintles 45 projecting in the same direction from a forked bracket 46 bolted or otherwise fastened to the head-plate 16. The cover-plate is normally held against shifting laterally in one direction by the hinge ears 44 abutting against the adjoining faces of the bracket and in the opposite direction by a cotter or projection 47 secured to one of the hinge-pintles. In order to effect the application and removal of the cover-plate to and from the hinge-pintles, the bore of that ear 44 companion to the pintle having the cotter is provided with a key-way or groove 48, which, when the cover is raised to the position shown by dotted lines in Fig. 2, is adapted to register with said pintle to permit the cover plate to be shifted laterally and readily removed without the use of tools and without disturbing any of the fastenings. This cover-plate is rigidly held in its normal horizontal position over the bowl by a pair of vertically-swinging clamps or hold-down levers 49 fulcrumed at 50 to corresponding brackets 51 fastened to the top of the head-plate. Coil springs 52 applied to the pivots 50 and engaging said levers normally tend to resist movement of the latter out of their operative position, shown in Figs. 1, 3 and 4. The top edges of the hold-down levers are rounded, as shown, so that when the cover-plate is swung down over the bowl, these levers will momentarily swing outward by engagement of the cover-plate therewith and then automatically swing inwardly or snap into clamping position over the top of said plate. For the purpose of supporting the latter in its elevated position, one of its ears 44 is provided with a stop-lug 44ª which is adapted to abut against the adjoining rear face of the bracket 46, as shown in Figs. 2 and 5.

Journaled in bearings 53 disposed on the cover-plate 43 is a horizontal cutter- or knife-shaft 54 having a hub 55 attached to its inner end on which a plurality of cutters 56 are mounted. This hub is detachably held in place on its shaft by a bolt 57. A hood 58 may be provided for enclosing the cutters, if desired. The cutter-shaft is indirectly driven from the electric motor 17 by mechanism which is preferably arranged and constructed as follows:

The numeral 59 indicates an arbor or driven shaft disposed end to end and in axial alinement with the cutter-shaft 54 and journaled in suitable bearings 60 contained in a bearing standard 61 applied to the head plate 16. Mounted on said shaft 59 is a sprocket wheel 62 connected by a sprocket chain 63 with a similar wheel 64 fixed on the driving shaft 29. For the purpose of controlling the cutter-shaft, the latter and the adjoining end of the shaft 59 are provided with clutch members 65, 66 of the jaw type, the member 65 being pinned or otherwise fixed on its shaft while the companion clutch member 66 is feathered on its shaft for movement lengthwise on its shaft. A clutch lever 67 controls the shifting of the clutch member 66 into and out of engagement with the clutch member 65, said lever having a collar 68 at its lower end fitted in a circular opening 69 in the hub 70 of the bearing standard 61. An eccentrically-mounted clutch-pin 71 projects downwardly from the clutch-lever collar and engages an annular groove 72 in the clutch member 66. In order to retain the clutch lever in its engaged and released positions, a spring-pressed locking pin 73 is mounted in the bearing standard hub 70 for interlocking engagement with one or the other of a pair of depressions 74 in the collar 68 of the clutch lever. The clearance between the opposing ends of the shafts 54 and 59 is such as to freely permit the raising and lowering of the cover plate 43 when desired.

The outer end of the shaft 59 may, if desired, be provided with a clutch member 75 for driving other appliances located alongside or attached to this machine. When this clutch member is not in use it is covered by a suitable plate 76 secured to the bearing standard 61.

An automatic safety brake is provided for arresting or preventing rotation of the cutter-shaft 54 when the cover-plate 43 is swung from its normal horizontal position to its inoperative elevated position. In the preferred construction of this brake mechanism shown in Figs. 3, 7 and 8, the same consists of a laterally-shiftable brake shoe 77 having a suitable lining 77ª adapted to frictionally engage a brake drum 78 formed on the clutch member 65. Said brake shoe is formed at the front end of a shank 79 guided for movement in a housing 80 applied to the cover-plate. A coil spring 81 contained in this housing and bearing against the inner end of the brake shoe shank serves to constantly urge the brake toward the brake drum. The brake is normally held in its released position by a pin 82 projecting downwardly from the shank 79 of the brake shoe and abutting against the opposing side of a companion pin 83 extending upwardly from the adjacent bracket 51. The opposing ends of these pins are beveled, as shown at 84, and extend into an opening 85 in the cover plate, the pin 82 also passing through alining slots 86 in the housing 80 to enable the brake to move freely lengthwise thereof to effect its application and release. When the cover plate is raised to the position shown in Fig. 8, the brake mechanism moves with it and as the beveled face of the pin 82 recedes from the correspondingly beveled face of the pin 83, the brake shoe is automatically moved in a direction to apply the brake and arrest the rotation of the cutter-shaft. When the cover-plate is returned to its normal position, the beveled face of the pin 82 encounters the corresponding face of the pin 83, resulting in the brake being automatically shifted to its released position, shown in Fig. 7.

Means are provided for controlling the rotation of the meat-bowl 31 whereby the same may be operated simultaneously with or independently of the cutter-shaft 54. To this end, the bearing bracket 30, which supports the driving shaft 29, is pivoted at 87 to the underside of the head-plate 16 for movement in a horizontal plane, whereby the worm 35ᵃ may be shifted into or out of engagement with its worm wheel 35. As shown in Fig. 9, a link 88 extends forwardly from the bracket 30 and through an opening 89 in the head-plate where it is pivotally connected to an actuating lever 90 fulcrumed for horizontally-swinging movement on a stud 91 formed on the front side of said head-plate. Thus, when this lever is swung in the direction of the arrow from the full line position to the dotted line position shown in Fig. 9, the bearing-bracket 30 is swung in a corresponding direction to bring the worm out of engagement with the worm wheel, thereby preventing rotation of the bowl. It will be noted that the shaft 29 extends through a slot 92 in the gear case 34 and a suitable packing 93 is applied to the shaft exterior of the case to prevent the leakage of lubricant therefrom. This packing may be firmly retained against the wall of the gear case by guiding the same in a groove or channel 94 preferably formed integrally with said case.

Arranged in a dove-tailed groove 95 in the underside of the cover plate 43 is a comb 96 through which the cutters 56 are adapted to pass. This comb is detachably held in place by a screw stud 97 attached to the same and extending through a notch or recess 98 in the rear portion of the cover-plate, an adjusting nut 99 being applied to said stud for clamping the comb in place against rearward displacement.

Briefly stated, the operation of the machine is as follows:

Assume the parts to be in position ready for cutting the meat or vegetables, which have been previously dumped into the meat-bowl 31. In this position, the clutch lever 67 is shifted to the dotted line position shown in Fig. 4 to engage the clutch members 65, 66 and thus rotate the cutters 56, and the lever 90 is shifted from the dotted line to the full line position shown in Fig. 9 to bring the worm 35ᵃ in engagement with the worm wheel 35 to rotate the bowl. Whenever it is desired to arrest the bowl or cutters, the respective control levers 67 or 90 are moved to their released positions. To raise the cover-plate 43 with its cutter mechanism to the position shown by dotted lines in Fig. 2, the clutch lever is first moved to the full line position shown in Fig. 2, after which the hold-down levers 49 are pushed outward to disengage them from said cover and allow the same to be swung upward. By swinging the cover plate upward, the brake 77 is automatically applied in the manner previously described, thereby preventing rotation of the cutters and safeguarding the operator against injury. While the cover plate is up, the meat-bowl can be readily removed, if desired, by simply giving it a partial turn to release the coupling pins 41 from their locking slots 42.

I claim as my invention:

1. In a machine of the character described, the combination of a frame, a rotatable member mounted thereon, and a container removably applied to said rotatable member to turn therewith, said member and said container having complemental interlocking elements for retaining the container in operative engagement with and against vertical displacement on its rotatable member.

2. In a machine of the character described, the combination of a frame, a rotatable head mounted thereon, and a container having a depending flange engaging said head, the latter and said container-flange having complementary pins and slots for detachably holding the container on the rotatable head.

3. In a machine of the character described, the combination of a frame having a recess in its top, a rotatable head mounted on said frame and extending into said recess in spaced relation thereto, a container having a depending bearing flange detachably connected with the rotatable head and extending into the space between the recess-wall and the periphery of said head, and complemental interlocking elements applied to the head and the container-flange.

4. In a machine of the character described, the combination of a frame, a rotary bowl mounted thereon, a cover-plate arranged over the bowl and hinged to the frame, a cutter shaft journaled on said plate, a driven shaft journaled on said frame in line with the cutter shaft in the closed position of said cover-plate, and cooperating clutch members applied to the opposing ends of said shafts, respectively.

5. In a machine of the character described, the combination of a frame, a rotary bowl mounted thereon, a cover-plate arranged over said bowl and hinged to the frame, a cutter shaft journaled on said plate, a driving shaft on the frame and geared to said rotary bowl and to said cutter shaft, and means for independently controlling the transmission of motion to said parts.

6. In a machine of the character described, the combination of a frame, a rotary bowl mounted thereon, a cover-plate arranged over said bowl and hinged to the frame, a cutter shaft journaled on said plate, a driven shaft journaled on said frame in line with the cutter shaft in the closed position of said cover-plate, a driving shaft geared to said rotary bowl and to said driven shaft, a clutch associated with the cutter shaft and said driven shaft, and means associated with said driving shaft for controlling independently the transmission of motion to said bowl.

7. In a machine of the character described, the combination of a frame, a rotary bowl mounted thereon, a cover-plate arranged over said bowl and hinged to said frame, a cutter shaft journaled on said plate, a driven shaft journaled on said frame in line with the cutter shaft in the closed position of said cover-plate, clutch members applied to the opposing ends of said shafts, respectively, and a shiftable driving shaft mounted on said frame and geared to said bowl and to said driven shaft.

8. In a machine of the character described, the combination of a frame, a rotary bowl including a worm wheel mounted thereon, a cover plate arranged over said bowl and hinged to the frame, a cutter shaft journaled on said plate, a driven shaft journaled on said frame in line with the cutter shaft in the closed position of said cover-plate, a clutch associated with said cutter shaft and said driven shaft, a shiftable bearing-bracket fulcrumed on said frame, a driving shaft journaled on said bracket and having a worm at one end arranged to engage the worm wheel on said bowl, and a flexible driving connection between said driving shaft and said driven shaft.

9. In a machine of the character described, the combination of a frame, a rotary bowl including a cutter mounted thereon, a movable cover-plate arranged over said bowl, a shaft for the cutter journaled on said plate, and an automatic brake for said cutter-shaft mounted on the cover-plate and movable to its applied position whenever said plate is moved to an inoperative position.

10. In a machine of the character described, the combination of a frame, a rotary bowl including a cutter mounted thereon, a movable cover-plate arranged over said bowl, a shaft for the cutter journaled on said plate, a brake mounted on the plate and movable toward and from the cutter shaft, and means for controlling the shifting of said brake to its applied or released positions whenever said cover-plate is raised or lowered, respectively.

11. In a machine of the character described, the combination of a frame, a rotary bowl including a cutter mounted thereon, a movable cover-plate arranged over said bowl, a shaft for the cutter journaled on said plate, a brake mounted on the plate and movable toward and from the cutter-shaft, a stationary element mounted on said frame, and a companion element attached to said brake for engagement with said first-named element, said elements holding the brake in its released position when engaged.

12. In a machine of the character described, the combination of a frame, a rotary bowl including a cutter mounted thereon, a movable cover-plate arranged over said bowl, a shaft for the cutter journaled on said plate, a brake mounted on the plate and movable toward and from the cutter-shaft, means for yieldingly moving said brake to its applied position, and opposing members on said frame and said brake for normally maintaining the latter in its released position.

13. In a machine of the character described, the combination of a frame, a rotary bowl including a cutter mounted thereon, a movable cover-plate arranged over said bowl, a shaft for the cutter journaled on said plate, a brake mounted on the plate and movable toward and from the cutter-shaft, means for yieldingly moving said brake to its applied position, a downwardly-projecting pin carried by the brake, and a companion pin fixed on said frame and in engagement with said first-named pin in the closed position of said cover to retain said brake in its released position, the opposing ends of said pins being beveled and serving to shift said brake from its applied to its released position when the cover is moved from an open to a closed position.

14. In a machine of the character described, the combination of a rotary bowl including a cutter, a cover-plate arranged over said bowl, and having a longitudinal groove in its bottom, a comb for the cutter removably seated in said groove, a stud carried by said comb, and a nut applied to said stud for clamping the comb against endwise displacement in its groove.

EUGENE W. KNOWLTON.